US009491068B2

(12) United States Patent
Lin et al.

(10) Patent No.: US 9,491,068 B2
(45) Date of Patent: Nov. 8, 2016

(54) METHOD, APPARATUS, AND SYSTEM FOR FLOW MEASUREMENT

(71) Applicant: Huawei Technologies Co., Ltd., Shenzhen, Guangdong (CN)

(72) Inventors: Chengyong Lin, Beijing (CN); Yinben Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

(21) Appl. No.: 13/867,572

(22) Filed: Apr. 22, 2013

(65) Prior Publication Data

US 2013/0294249 A1 Nov. 7, 2013

(30) Foreign Application Priority Data

Apr. 23, 2012 (CN) .......................... 2012 1 0121473

(51) Int. Cl.
 *H04L 12/26* (2006.01)
 *H04L 12/801* (2013.01)
 *H04W 28/02* (2009.01)

(52) U.S. Cl.
 CPC ........... *H04L 43/028* (2013.01); *H04L 43/026* (2013.01); *H04L 43/0876* (2013.01); *H04L 47/11* (2013.01); *H04W 28/0215* (2013.01)

(58) Field of Classification Search
 None
 See application file for complete search history.

(56) References Cited

U.S. PATENT DOCUMENTS

2011/0310734 A1* 12/2011 Mizukoshi ..................... 370/231
2012/0051229 A1 3/2012 Feldmann et al.
2012/0170477 A1* 7/2012 Hieda ........................... 370/252
2013/0010600 A1* 1/2013 Jocha ..................... H04L 43/026
 370/236.2
2013/0142073 A1* 6/2013 Shikitani ....................... 370/252
2013/0177016 A1* 7/2013 Nakano et al. ............... 370/389

FOREIGN PATENT DOCUMENTS

| CN | 1941716 A | 4/2007 |
|---|---|---|
| CN | 101325597 A | 12/2008 |
| EP | 2608461 A1 | 6/2013 |
| JP | 2006254134 A | 9/2006 |
| JP | 2008219685 A | 9/2008 |

(Continued)

OTHER PUBLICATIONS

Extended European Search Report in corresponding European Patent Application No. 13163821.5 (Aug. 9, 2013).

*Primary Examiner* — Hassan Phillips
*Assistant Examiner* — Saba Tsegaye
(74) *Attorney, Agent, or Firm* — Leydig, Voit & Mayer, Ltd.

(57) ABSTRACT

Embodiments of the present invention provide a method, an apparatus, and a system for flow measurement, which are used to reduce management bandwidth of a controller over a forwarding device. The method includes: receiving a data flow sent by a forwarding device, and knowing the type of the data flow by parsing the data flow; if the type of the data flow is a preset type in a measurement flow type set, obtaining a feature identifier carried in the data flow and packet header information of the data flow, and obtain operation information corresponding to the data flow, and adding a measurement operation for the feature identifier to the operation information, where the operation information is used to record various operations of the data flow; and sending, to the forwarding device, the packet header information and the operation information added with the measurement operation for the feature identifier.

13 Claims, 8 Drawing Sheets

(56) References Cited

FOREIGN PATENT DOCUMENTS

| JP | 2010068279 A | 3/2010 |
| WO | WO 2011118575 A1 | 9/2011 |
| WO | WO 2012011290 A1 | 1/2012 |
| WO | WO 2012023538 A1 | 2/2012 |
| WO | WO 2012049807 A1 | 4/2012 |

* cited by examiner

METHOD, APPARATUS, AND SYSTEM FOR FLOW MEASUREMENT

CROSS-REFERENCE TO RELATED APPLICATION

This application claims priority to Chinese Patent Application No. 201210121473.8, filed on Apr. 23, 2012, which is hereby incorporated by reference in its entirety.

FIELD OF THE INVENTION

The present invention relates to the communications field, and in particular to a method, an apparatus, and a system for flow measurement.

BACKGROUND OF THE INVENTION

OpenFlow (OpenFlow) is a new-type network switch model, which greatly drives the innovative development of a network. An OpenFlow network includes three parts: an OpenFlow Switch (OpenFlow switch), a FlowVisor (flow converter), and a Controller (control server). The OpenFlow switch performs forwarding on a data layer; the FlowVisor performs virtualization on the network; and the Controller performs centralized control on the network to implement functions of a control layer. The OpenFlow network implements data forwarding on the OpenFlow Switch and data forwarding control on the Controller, thereby implementing separation of a data forwarding layer and the control layer. Each OpenFlow Switch has one flow table for implementing packet lookup and forwarding. The OpenFlow Switch may be connected to the Controller by using a secure channel through the OpenFlow protocol, so that the Controller queries and manages the flow table.

Generally, measurement is performed for a data flow itself in a flow measurement technology. For example, a data flow, a flow table, or a data flow passing through a port is measured. In the OpenFlow measurement technology, the Controller automatically queries the OpenFlow Switch to obtain data traffic for OpenFlow traffic management.

In a process of implementing the OpenFlow traffic management, the inventor finds at least the following problems in the prior art:

During OpenFlow traffic management, when a traffic query is being performed for a massive data flow, a large number of query and response traffic packets are generated and a high management bandwidth is exhausted, which may cause communications congestion between a controller and a forwarding device.

SUMMARY OF THE INVENTION

Embodiments of the present invention provide a method, an apparatus, and a system for flow measurement to reduce management bandwidth of a controller over a forwarding device, thereby alleviating communications congestion.

To achieve the above objective, embodiments of the present invention use the following technical solutions:

A method for flow measurement includes: receiving a data flow sent by a forwarding device, where the data flow includes a feature identifier, and knowing the type of the data flow by parsing the data flow; if the type of the data flow is a preset type in a measurement flow type set, obtaining the feature identifier and packet header information, and obtaining operation information corresponding to the data flow, and adding a measurement operation for the feature identifier to the operation information, where the operation information is used to record various operations of the data flow; and sending, to the forwarding device, the packet header information and the operation information added with the measurement operation for the feature identifier, so that the forwarding device performs traffic measurement on the data flow according to the feature identifier;

Another method for flow measurement includes: receiving a data flow, where the data flow includes a feature identifier, and obtaining matching information of the data flow; searching a flow table by using the matching information, and if no information that is consistent with the matching information exists in the flow table, sending the data flow to a controller; receiving packet header information and operation information of the data flow that are sent by the controller, and writing the packet header information and operation information into the flow table, where the operation information contains at least a measurement operation for the feature identifier carried in the data flow; searching a measurement instance table according to the feature identifier carried in the data flow in the measurement operation, where the measurement instance table is used to record a feature identifier of a sent data flow and its corresponding traffic information; if a first feature identifier is recorded in the measurement instance table and the first feature identifier is consistent with the feature identifier carried in the data flow, updating, in the flow table and according to an index of an entry corresponding to the first feature identifier in the measurement instance table, the measurement operation for the feature identifier carried in the data flow to a measurement operation for the index; and executing various operations in the operation information in the flow table, and when executing a measurement operation in the operation information in the flow table, updating traffic information corresponding to the first feature identifier recorded in the measurement instance table;

A controller includes: a knowing unit, configured to receive a data flow sent by a forwarding device, where the data flow includes a feature identifier, and know the type of the data flow by parsing the data flow; a first obtaining unit, configured to, if the type of the data flow is a preset type in the measurement flow type set, obtain the feature identifier carried in the data flow and packet header information of the data flow, and obtain operation information corresponding to the data flow, and add a measurement operation for the feature identifier to the operation information; and a sending unit, configured to send, to the forwarding device, the operation information added with the measurement operation for to the feature identifier and the packet header information that are obtained by the obtaining unit, so that the forwarding device performs traffic measurement on the data flow according to the feature identifier.

A forwarding device includes: a first receiving unit, configured to receive a data flow, where the data flow includes a feature identifier; a first obtaining unit, configured to obtain matching information of the data flow according to the data flow received by the first receiving unit; a first searching unit, configured to search a flow table by using the matching information; a first sending unit, configured to send the data flow to a controller if no information that is consistent with the matching information exists in the flow table; a second receiving unit, configured to receive packet header information and operation information of the data flow that are sent by the controller, and send the received packet header information and operation information of the data flow to a writing unit; the writing unit, configured to write, into the flow table, the received packet header information and operation information of the data flow that are sent by the second receiving unit, where the operation information contains at least a measurement operation for the feature identifier carried in the data flow; a second searching unit, configured to search a measurement instance table according to the feature identifier in the measurement operation, where the measurement instance table is used to record a feature identifier of a sent data flow and its corresponding traffic information; a first updating unit, configured to, if a first feature identifier is recorded in the measurement instance table and the first feature identifier is consistent with the feature identifier carried in the data flow, update, in the flow table and according to an index of an entry corresponding to the first feature identifier in the measurement instance table, the measurement operation for the feature identifier carried in the data flow to a measurement operation for the index; an executing unit, configured to execute each operation in the operation information of the flow table, and when executing the measurement operation, update traffic information corresponding to the first feature identifier recorded in the measurement instance table; and a first storage unit, configured to store the flow table and the measurement instance table.

A system for flow measurement includes: a controller and a forwarding device, where the controller is the above controller and the forwarding device is the above forwarding device.

The embodiments of the present invention provide a method, an apparatus, and a system for flow measurement. A forwarding device receives a data flow, obtains the matching information of the data flow to search a flow table, and if no information that is consistent with the matching information exists in the flow table, sends the data flow to a controller. The controller receives the data flow sent by the forwarding device, identifies that the data flow is a data flow that needs to be measured, obtains a feature identifier carried in the data flow, packet header information, and operation information corresponding to the data flow, adds a measurement operation for the feature identifier to the operation information, and sends the obtained information to the forwarding device. The forwarding device receives the information sent by the controller, updates the flow table according to the received information, and searches a measurement instance table according to the feature identifier. If a same item is found, according to an index of an entry corresponding to the first feature identifier in the measurement instance table, the measurement operation for the feature identifier carried in the data flow is updated in the flow table to a measurement operation for the index and when the measurement operation is being executed, traffic information corresponding to the feature identifier recorded in the measurement instance table is updated. Meanwhile, the forwarding device further periodically reports measured data traffic to the controller. This implements traffic measurement on the data flow according to the feature identifier, improves a traffic measurement capability, and reduces management bandwidth of the controller over the forwarding device, thereby alleviating communications congestion.

BRIEF DESCRIPTION OF THE DRAWINGS

To illustrate the technical solutions in the embodiments of the present invention more clearly, the following briefly introduces accompanying drawings required for describing the embodiments. Apparently, the accompanying drawings in the following descriptions merely show some embodiments of the present invention, and a person of ordinary skill in the art may still derive other drawings from the accompanying drawings without creative efforts.

DETAILED DESCRIPTION OF THE EMBODIMENT

The following clearly describes the technical solutions in the embodiments of the present invention with reference to the accompanying drawings in the embodiments of the present invention. Apparently, the described embodiment is merely a part rather than all of the embodiments of the present invention. All other embodiments obtained by a person of ordinary skill in the art based on the embodiments of the present invention without creative efforts shall fall within the protection scope of the present invention.

Figure 1:
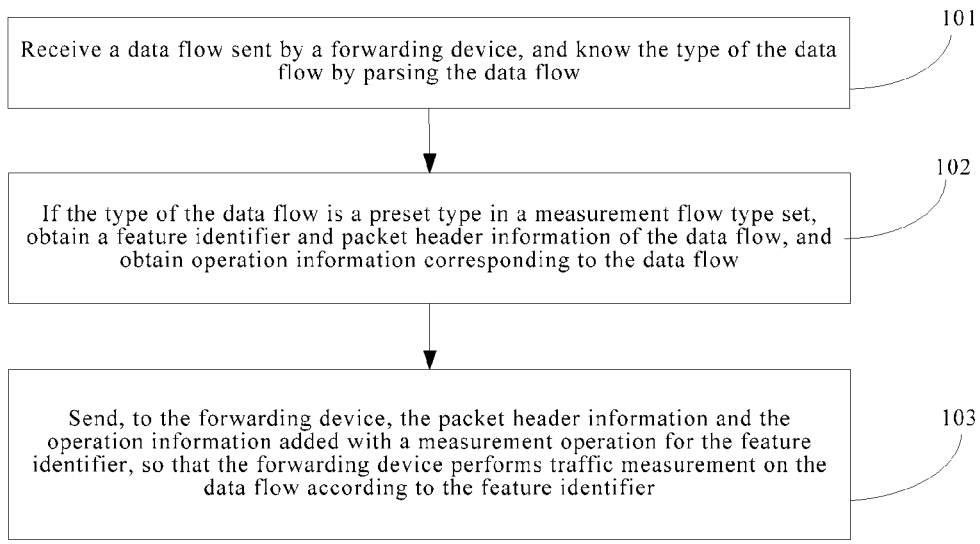
FIG. 1 is a first flowchart of a method for traffic measurement according to an embodiment of the present invention.

An embodiment of the present invention provides a method for flow measurement, as shown in FIG. 1, including:

101. Receive a data flow sent by a forwarding device, where the data flow includes a feature identifier, and know the type of the data flow by parsing the data flow.

It should be noted that the forwarding device sends the received data flow to a specified interface or another device. The forwarding device may be a switch, a router, or another device with a forwarding function. The present invention does not impose a restriction on this.

Specifically, after receiving the data flow sent by the forwarding device, a controller knows the type of the data flow by parsing information of packets that form the data flow.

102. If the type of the data flow is a preset type in a measurement flow type set, obtain the feature identifier and packet header information of the data flow, and obtain operation information corresponding to the data flow, and add a measurement operation for the feature identifier to the operation information, where the operation information is used to record various operations of the data flow.

Specifically, presetting a type is setting type presetting of a data flow category to a type of a data flow that needs measurement. A measurement flow type set refers to a set storing a preset type. The type of an identified data flow is compared with the preset type in the measurement flow type set. If the type of the data flow is a preset type in the measurement flow type set, the data flow of this type is a measurement flow. A feature identifier carried in the data flow and packet header information are obtained and each operation of the data flow is decided by the controller according to a service of the data flow at a service layer. Therefore, operation information corresponding to the data flow is obtained and a measurement operation for the feature identifier carried in the data flow is added to the operation information. When the measurement operation is written into the operation information, the feature identifier is used as a parameter, and preferentially, the measurement operation is written in a count identifier form.

It should be noted that a feature identifier, which is used as a measurement item identifier, enables the forwarding device to measure the data flow for the feature identifier. The identifier may be a user identifier, may also be a service identifier, and may also be a protocol type. The present invention does not impose a restriction on this.

103. Send, to the forwarding device, the packet header information and the operation information added with the measurement operation for the feature identifier, so that the forwarding device performs traffic measurement on the data flow according to the feature identifier.

This embodiment of the present invention provides a method for flow measurement. A data flow sent by a forwarding device is received and identified. In a case that the data flow is a measurement flow, a feature identifier carried in the data flow and packet header information, and obtain operation information corresponding to the data flow are obtained. In addition, a measurement operation for the feature identifier is added to the operation information and sent to the forwarding device, so that the forwarding device may perform traffic measurement on the data flow according to the feature identifier. This implements traffic measurement on the data flow according to the feature identifier, improves a traffic measurement capability, and reduces management bandwidth, thereby alleviating communications congestion.

Figure 2:
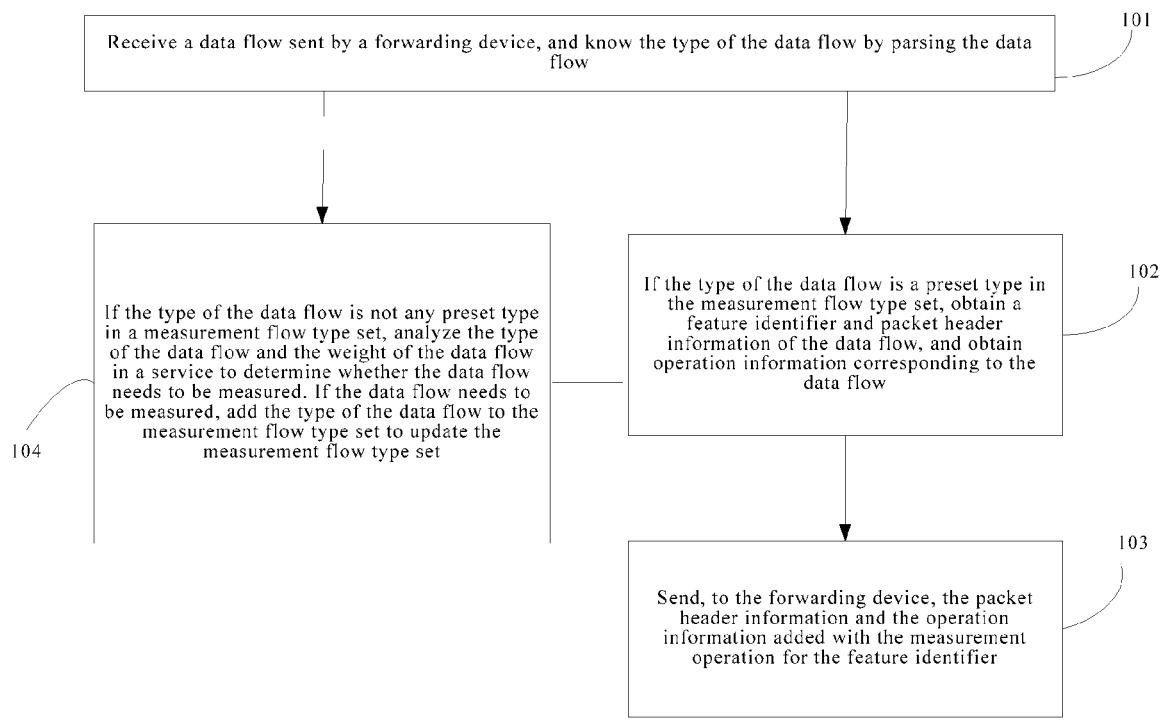
FIG. 2 is a second flowchart of a method for traffic measurement according to an embodiment of the present invention.

The method, as shown in FIG. 2, after step 101, further includes:

104. If the type of the data flow is not any preset type in the measurement flow type set, analyze the type of the data flow and the weight of the data flow in a service to determine whether the data flow needs to be measured. If the data flow needs to be measured, add the type of the data flow to the measurement flow type set to update the measurement flow type set.

Specifically, after a data flow is received and the type of the data flow is identified, it is known that the type of the data flow is not any preset type in the measurement flow type set by searching the measurement flow type set. Then, the type of the data flow and the weight of the data flow in the service are analyzed to determine whether the data flow needs to be measured. If the data flow needs to be measured, the type of the data flow is added to the measurement flow type set to update the measurement flow type set. If the data flow does not need to be measured, the type of the data flow is discarded and the measurement flow type set is not updated.

It should be noted that the method may be applied to flow measurement on an OpenFlow network, and may also be applied to flow measurement on an Internet network. The present invention does not impose a restriction on this. The flow measurement on the OpenFlow network is used as an example for description in all embodiments of the present invention.

For example, on the OpenFlow network, the controller may be an OpenFlow controller and the forwarding device may be an OpenFlow switch.

Through step 104, after a new-type data flow is received, preset data flow types in the measurement flow type set may be updated in real time, so that the type of the data flow that needs to be measured for a feature identifier is recorded to facilitate type matching of a subsequent data flow.

Figure 3:
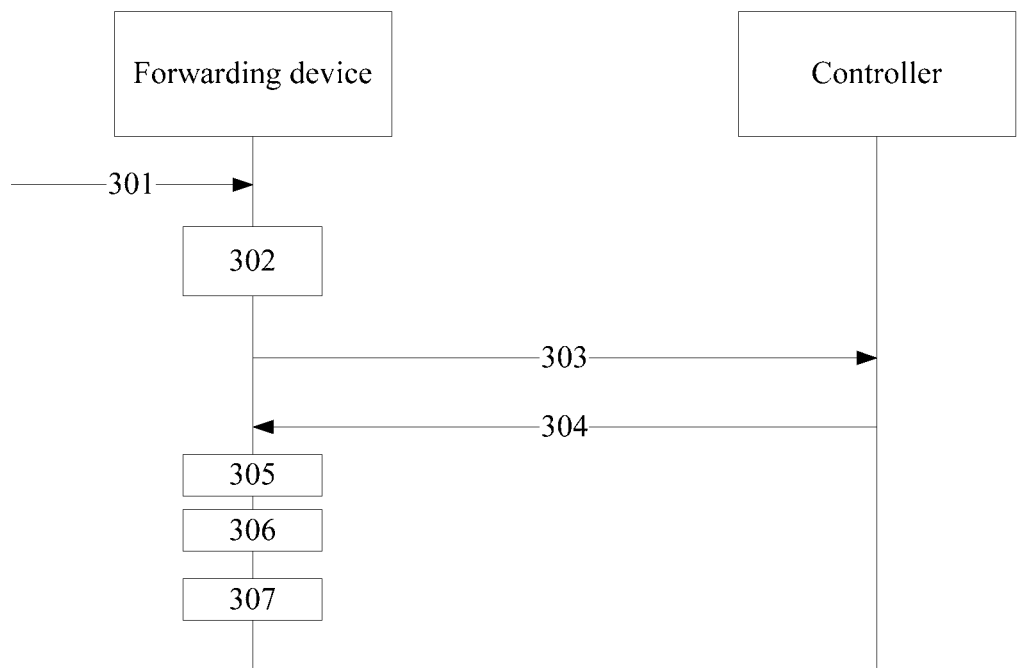
FIG. 3 is a third flowchart of a method for traffic measurement according to an embodiment of the present invention.

An embodiment of the present invention provides a method for flow measurement, as shown in FIG. 3, including:

301. Receive a data flow, where the data flow includes a feature identifier, and obtain matching information of the data flow.

The matching information is partial information of the data flow, where the partial information needs to be matched with a flow table and is obtained by a forwarding device according to a matching method stored on the forwarding device itself 302. Search the flow table by using the matching information.

Table 1 shows the flow table.

303. Send the data flow to a controller if no information that is consistent with the matching information exists in the flow table.

Specifically, the flow table is searched by using the matching information obtained in step 301. On an OpenFlow network, a flow table is used to record an ingress interface, a source Ethernet address, a target Ethernet address, a type, a vlan identifier, a vlan priority, a source IP address, a target IP address, a protocol, an IP ToS bit, a target TCP/UDP port, and a source TCP/UDP port of a data flow, measured data traffic, and each operation corresponding to the data flow. Optionally, each entry of the flow table includes three fields: a packet header field, a first counter, and an operation field. The packet header field is used to record an ingress interface, a source Ethernet address, a target Ethernet address, a type, a vlan identifier, a vlan priority, a source IP address, a target IP address, a protocol, an IP ToS bit, a target TCP/UDP port, and a source TCP/UDP port of a data flow. The first counter is used to record data traffic which is mainly measured for one flow table, one data flow, or one port. The operation field is used to record each operation corresponding to a data flow. Each entry of the flow table includes the content of the three fields, as shown in Table 1.

TABLE 1

| Packet header field | First counter | Operation field |

304. Receive packet header information and operation information of the data flow that are sent by the controller, and write the packet header information and operation information into the flow table, where the operation information contains at least a measurement operation for the feature identifier carried in the data flow.

Specifically, a data flow that does not match the flow table in step 303 is sent to the controller. The controller parses the data flow, and returns, to the forwarding device, packet header information and operation information that are obtained by the parsing. After receiving the packet header information and operation information, the forwarding device adds the packet header information to the packet header field in the flow table, and adds the operation information to the operation field in the flow table. The operation information has the measurement operation for the feature identifier carried in the data flow, and the measurement operation in the operation information uses the feature identifier as a parameter. Preferentially, the measurement operation is written in count identifier form into the operation field of the flow table. In addition, the forwarding device fills the first counter in the entry of the flow table with 0.

It should be noted that the packet header information indicates the ingress interface, source Ethernet address, target Ethernet address, type, vlan identifier, vlan priority, source IP address, target IP address, protocol, IP ToS bit, target TCP/UDP port, and source TCP/UDP port of the data flow that are obtained by the controller through parsing. there is a difference from the matching information obtained by the forwarding device itself: The matching information refers to some necessary matching information obtained by the forwarding device according to a matching algorithm of the forwarding device itself after receiving a data flow. Packet header information that has been stored in the flow table is searched for by using the matching information. However, detailed packet header information of the data flow cannot be directly obtained, but the detailed packet header information of the data flow should be obtained through parsing by the controller after the flow table fails to be searched.

305. Search a measurement instance table according to the feature identifier in the measurement operation, where the measurement instance table records a feature identifier of a sent data flow and its corresponding traffic information.

Specifically, when the operation information is written into the operation field of the flow table in step 304, the measurement operation for the feature identifier carried in the data flow is added to the operation information, and therefore, when the measurement operation is written into the operation field of the flow table, the feature identifier carried in the data flow may be obtained and the measurement instance table may searched according to the feature identifier. The measurement instance table records the feature identifier of the sent data flow and its corresponding traffic information. Optionally, each entry in the measurement instance table, as shown in Table 2, includes: an identifier field and a second counter. The identifier field is used to record a feature identifier of a data flow. The second counter is used to record traffic information corresponding to the feature identifier recorded in the identifier field and may measure other information of the data flow, such as a packet, a byte, and an error packet. Before a measurement operation is performed, the forwarding device fills the second counter in the entry in the measurement instance table with 0.

TABLE 2

| Identifier field | Second counter |
| --- | --- |

Step 305 further includes: increasing, by 1, the number of times the measurement instance table is referenced.

Specifically, the measurement instance table is further used to record the number of times the measurement instance table is referenced by a data flow. A reference times field is added to each entry in the measurement instance table, as shown in Table 3, to record the number of times the measurement instance table is referenced by a data flow. If one item that matches the feature identifier in the measurement operation is recorded in the measurement instance table, the counting number of the reference times field of the measurement instance table is increased by 1. If no entry that matches the feature identifier in the measurement operation exists in the measurement instance table, the reference times field of the measurement instance table is filled as 1 when one entry is added to the measurement instance table and the feature identifier carried in the data flow is added to the entry.

TABLE 3

| Identifier field | Second counter | Reference times field |
| --- | --- | --- |

306. If a first feature identifier is recorded in the measurement instance table and the first feature identifier is consistent with the feature identifier carried in the data flow, update, in the flow table and according to an index of an entry corresponding to the first feature identifier in the measurement instance table, the measurement operation for the feature identifier carried in the data flow to a measurement operation for the index.

It should be noted that the index can be a storage address, and may also be an index number, or another identifier that may represent the entry corresponding to the first feature identifier. The index number refers to a serial number of an entry in the measurement instance table in sequencing when the entry corresponding to the first feature identifier is added to the measurement instance table in sequence.

Specifically, if the feature identifier carried in the data flow is consistent with one feature identifier recorded in the identifier field of the measurement instance table, that is, the first feature identifier is recorded in the measurement instance table, a parameter of the measurement operation in the operation information in the operation field of the flow table is changed by replacing the feature identifier carried in the data flow with the index of the entry corresponding to the first feature identifier. Preferentially, the measurement operation is represented in a count countIndex form in the operation field in the flow table, where countIndex represents the index of the entry in the measurement instance table. In this way, all parameters of the measurement operation in the flow table are changed to indexes of entries in the measurement instance table. After the forwarding device receives a data flow that matches the flow table and when a measurement operation is being performed, a corresponding entry in the measurement instance table may be directly found according to the countIndex parameter to perform traffic measurement.

307. Execute various operations in the operation information in the flow table, and when the measurement operation in the operation information in the flow table is being executed, update traffic corresponding to the first feature identifier recorded in the measurement instance table.

Specifically, when various operations in the operation information in the operation field of the flow table are executed and a measurement operation is being executed, the countIndex parameter carried in the measurement operation is used to search the measurement instance table for the entry corresponding to the parameter, traffic corresponding to the first feature identifier recorded in the second counter in the measurement instance table is updated, and the reference counting number of the reference times field of the measurement instance table is increased by 1.

The embodiment of the present invention provides a method for flow measurement. After receiving a data flow, a forwarding device obtains matching information of the data flow and searches a flow table by using the matching information. If no information that is consistent with the matching information of the data flow exists in the flow table, the data flow is sent to a controller. The forwarding device receives packet header information and operation information that are sent by the controller and adds the received information to the flow table to update the flow table. A measurement operation for a feature identifier carried in the data flow is added to the operation information and therefore a measurement instance table is searched according to the feature identifier. If a first feature identifier is recorded in the measurement instance table, according to an index of an entry corresponding to the first feature identifier in the measurement instance table, the measurement operation for the feature identifier carried in the data flow is updated in the flow table to a measurement operation for the index, and when the measurement operation is being executed, the traffic corresponding to the feature identifier recorded in the measurement instance table is updated. This implements traffic measurement on the data flow according to the feature identifier, improves a traffic measurement capability, and reduces management bandwidth of the controller over the forwarding device, thereby alleviating communications congestion.

Figure 4:
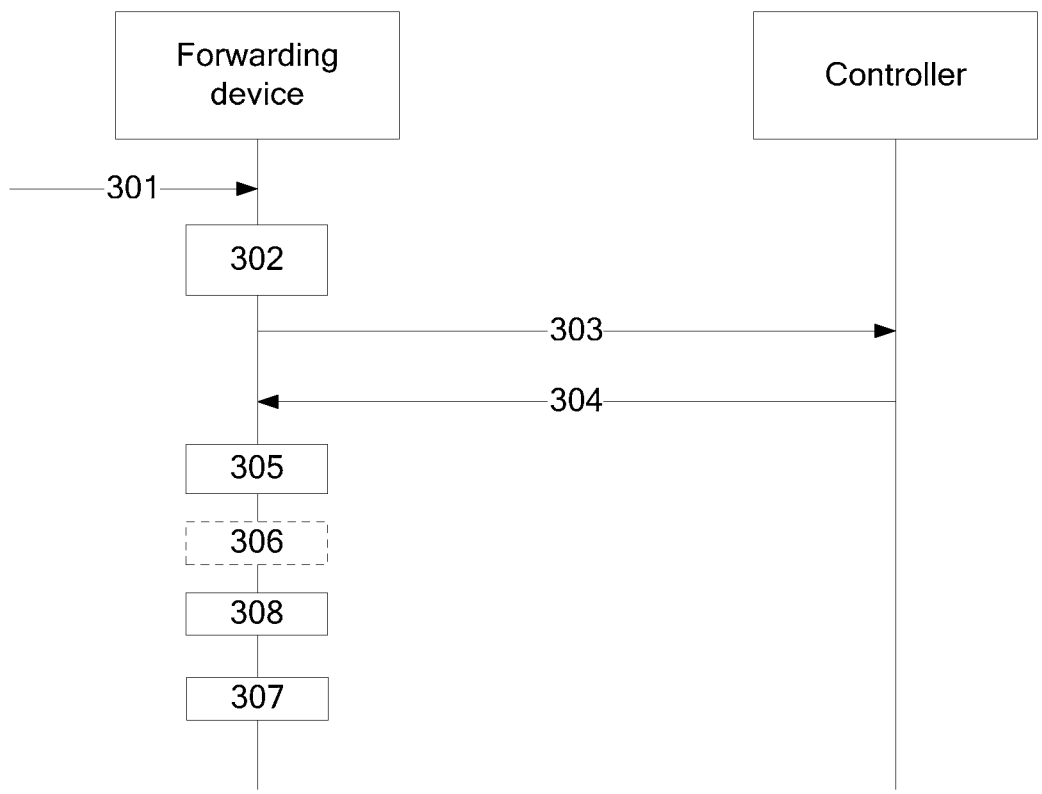
FIG. 4 is a fourth flowchart of a method for traffic measurement according to an embodiment of the present invention.

The method, as shown in FIG. 4, further includes:

308. If the first feature identifier is not recorded in the measurement instance table, add one entry of the measurement instance table, add, to the entry, the feature identifier carried in the data flow, and according to the index of the entry, update, in the flow table, the measurement operation for the feature identifier carried in the data flow to a measurement operation for the index.

Specifically, the first feature identifier does not exist in the measurement instance table, that is, no feature identifier that is consistent with the feature identifier carried in the data flow obtained in step 304 exists in the identifier field of the measurement instance table. In this case, one entry is added to the measurement instance table, and the feature identifier carried in the data flow obtained in step 304 is added to the newly added entry in the measurement instance table. In addition, the forwarding device fills the reference times field of the entry in the measurement instance table with 1 to update the measurement instance table. According to the index of the newly added entry, the measurement operation for the feature identifier carried in the data flow is updated in the flow table to a measurement operation for the index. In other words, according to the index of the newly added entry in the measurement instance table, a parameter of a measurement operation in the operation field of the flow table is changed by replacing the feature identifier carried in the data flow with the index of the entry in the measurement instance table. Preferentially, the measurement operation is represented in a count countIndex form, where countIndex represents the index of the entry in the measurement instance table. Further, when the measurement operation in the operation field of the flow table is being executed, the countIndex parameter carried in the measurement operation is used to search the measurement instance table for the entry in the measurement instance table corresponding to the parameter, and traffic information corresponding to the first feature identifier recorded in the second counter in the measurement instance table is updated.

The measurement instance table may be updated in step 308, a data flow that needs to be measured is recorded in a corresponding entry in the measurement instance table and all parameters of the measurement operation in the flow table may be changed to the indexes of the entries in the measurement instance table. After the forwarding device receives the data flow that matches the flow table and when a measurement operation is being performed, a corresponding entry in the measurement instance table may be directly found according to the countIndex parameter to perform traffic measurement.

It should be noted that the measurement instance table may be stored in a form of an array, a form of a linked table, a form of a tree, may also be stored in a form of a figure, and may also be stored in another storage form. The present invention does not impose a restriction on this.

Figure 5:
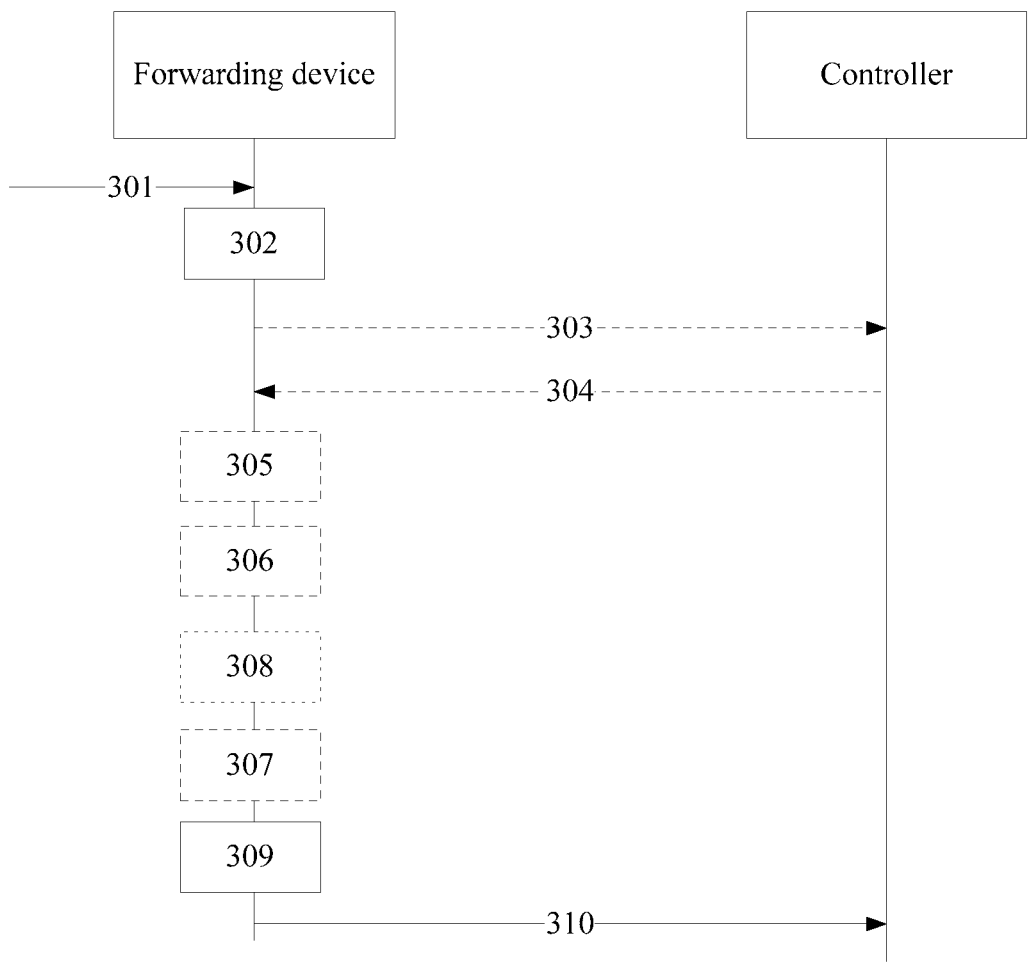
FIG. 5 is a fifth flowchart of a method for traffic measurement according to an embodiment of the present invention.

The method, as shown in FIG. 5, further includes:

309. If information that is consistent with the matching information exists in the flow table, process the data flow according to each operation in the operation information in the flow table.

When the measurement operation in the operation information is being executed, and according to an index of the measurement operation in the operation information in the flow table, the location of the entry that is in the measurement instance table and corresponds to the index is found and the traffic information corresponding to the first feature identifier in the measurement instance table is updated.

Specifically, the details when a measurement operation in the operation information is being executed are as follow: When a measurement operation is being executed, the parameter of the measurement operation is the index countIndex of an entry in the measurement instance table. Therefore, the forwarding device may directly find the corresponding entry in the measurement instance table according to the countIndex parameter of the measurement operation and updates the traffic information corresponding to a first feature identifier of the second counter in the entry in the measurement instance table.

According to step 309, after receiving a data flow, the forwarding device obtains the matching information of the data flow. If information that is consistent with the matching information is recorded in the flow table, the first counter recorded in the matching entry in the flow table is updated and the data flow is processed according to the operation information in the operation field of the matching entry. The corresponding entry in the measurement instance table may be found according to the index of the measurement operation in the operation information, and traffic measurement is performed on the data flow. This implements traffic measurement on the data flow according to the feature identifier, improves a traffic measurement capability, and reduces management bandwidth of the controller over the forwarding device, thereby alleviating communications congestion.

It should be noted that, in all embodiments of the present invention, an operation corresponding to the data flow may be stored in the operation information in the operation field of the flow table or in an operation set of a first storage unit. The present invention does not impose a restriction on this.

The method, as shown in FIG. 5, further includes:

310. Periodically report measured data traffic to the controller.

Through step 310, the forwarding device does not require a query by the controller but automatically reports the measured data traffic to the controller. This reduces management bandwidth of the controller over the forwarding device, thereby alleviating communications congestion.

It should be noted that the method may be applied to flow measurement on an OpenFlow network, and may also be applied to an Internet network. The present invention does not impose a restriction on this.

Figure 6:
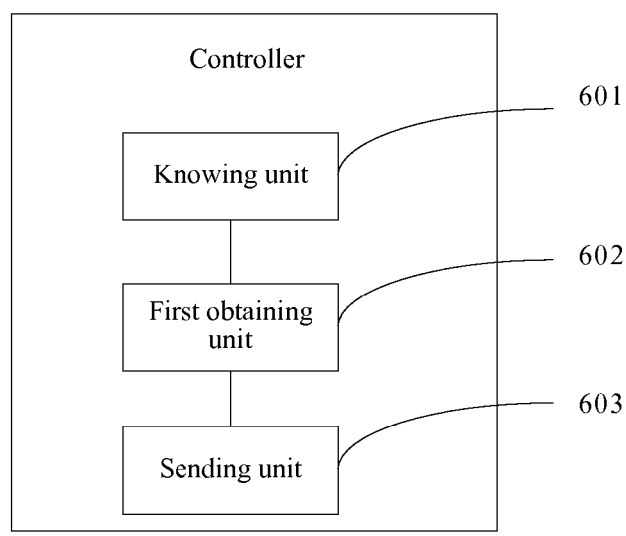
FIG. 6 is a schematic structural diagram of a controller according to an embodiment of the present invention.

An embodiment of the present invention provides a controller, as shown in FIG. 6, includes:

a knowing unit 601, configured to receive a data flow sent by a forwarding device, where the data flow includes a feature identifier, and know the type of the data flow by parsing the data flow;

a first obtaining unit 602, configured to, if the type of the data flow is a preset type in a measurement flow type set, obtain the feature identifier carried in the data flow and packet header information of the data flow, and obtain operation information corresponding to the data flow, and add a measurement operation for the feature identifier to the operation information; and a sending unit 603, configured to send, to the forwarding device, the packet header information and the operation information added with the measurement operation for the feature identifier, where the packet header information and the operation information are obtained by the first obtaining unit 602, so that the forwarding device performs traffic measurement on the data flow according to the feature identifier.

Figure 7:
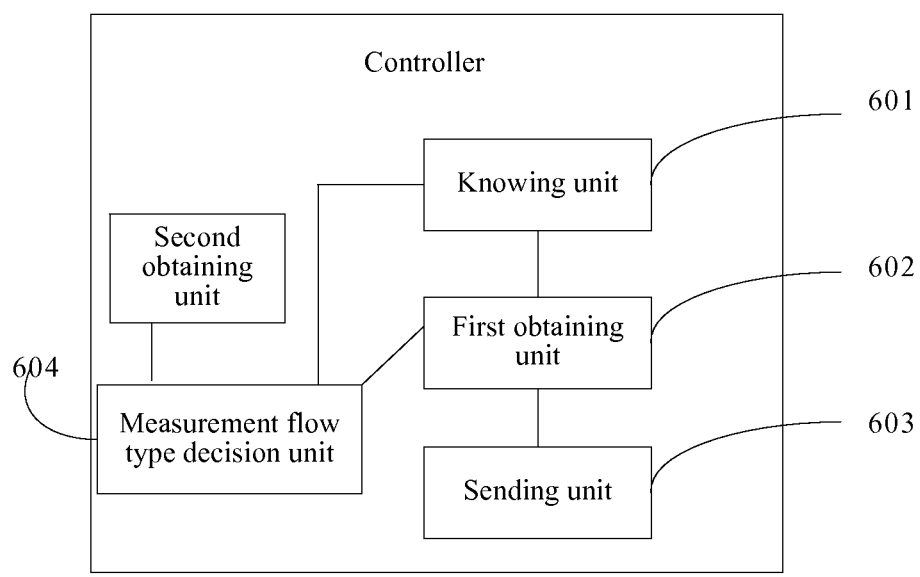
FIG. 7 is a schematic structural diagram of another controller according to an embodiment of the present invention.

The controller, as shown in FIG. 7, further includes:

a measurement flow type decision unit 604, configured to, if the type of the data flow is not any preset type in the measurement flow type set, analyze the type of the data flow and the weight of the data flow in a service to determine whether the data flow needs to be measured, and if the data flow needs to be measured and the type of the data flow does not exist in the measurement flow type set, add the type of the data flow to the measurement flow type set to update the measurement flow type set; and a second obtaining unit 605, configured to obtain the weight of the data flow in the service.

This embodiment of the present invention provides a controller. The knowing unit receives a data flow sent by a forwarding device and knows the type of the data flow. In a case that the data flow is a measurement flow, the first obtaining unit obtains the feature identifier carried in the data flow, packet header information, and operation information corresponding to the data flow, and adds a measurement operation for the feature identifier to the operation information. The sending unit sends the information obtained by the obtaining unit to the forwarding device, so that the forwarding device may perform traffic measurement on the data flow according to the feature identifier. In addition, when receiving a new-type data flow, the measurement flow type decision unit is capable of: determining, according to an parsing of the data flow of this type, whether the data flow of this type needs to be measured, and if a measurement is required, updating preset data flow types in a measurement flow type set in real time. In this way, the type of the data flow that needs to be measured for a feature identifier is recorded to facilitate type matching for a subsequent data flow. This implements traffic measurement on the data flow according to the feature identifier, improves a traffic measurement capability, and reduces management bandwidth, thereby alleviating communications congestion.

Figure 8:
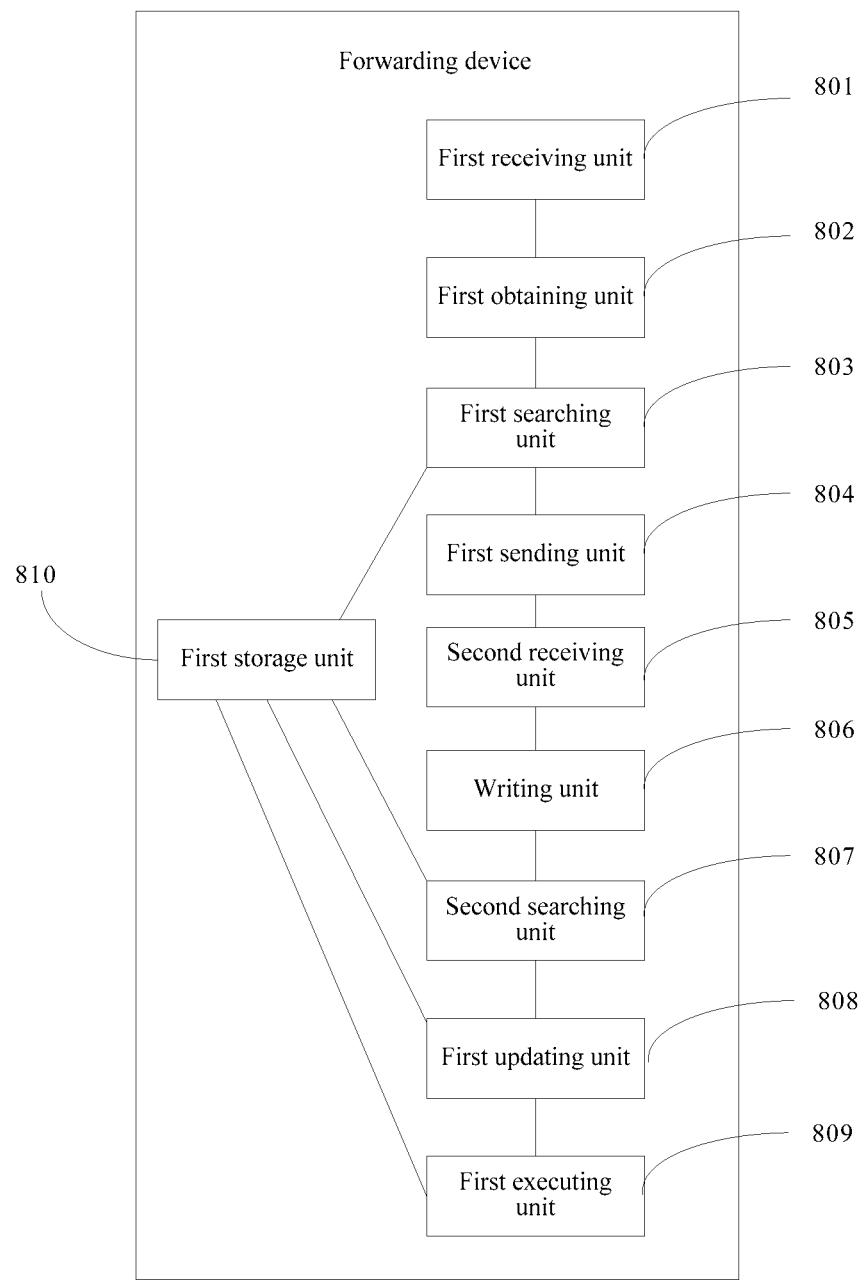
FIG. 8 is a schematic structural diagram of a forwarding device according to an embodiment of the present invention.

An embodiment of the present invention provides a forwarding device, as shown in FIG. 8, includes:

a first receiving unit 801, configured to receive a data flow, where the data flow includes a feature identifier;

a first obtaining unit 802, configured to obtain matching information of the data flow according to the data flow received by the first receiving unit 801;

a first searching unit 803, configured to search a flow table by using the matching information obtained by the first obtaining unit 802;

a first sending unit 804, configured to send the data flow to a controller if no information that is consistent with the matching information exists in the flow table;

a second receiving unit 805, configured to receive packet header information and operation information of the data flow that are sent by the controller, and send the received packet header information and operation information of the data flow to a writing unit 806;

the writing unit 806, configured to write, into the flow table, the received packet header information and operation information of the data flow that are sent by the second receiving unit 805, where the operation information contains at least a measurement operation for the feature identifier carried in the data flow;

a second searching unit 807, configured to search a measurement instance table according to the feature identifier in the measurement operation, where the measurement instance table is used to record a feature identifier of a sent data flow and its corresponding traffic information;

a first updating unit 808, configured to, if a first feature identifier is recorded in the measurement instance table and the first feature identifier is consistent with the feature identifier carried in the data flow, update, in the flow table and according to an index of an entry corresponding to the first feature identifier in the measurement instance table, the measurement operation for the feature identifier carried in the data flow to a measurement operation for the index;

a first executing unit 809, configured to execute each operation in the operation information of the flow table, and when executing the measurement operation, update traffic information corresponding to the first feature identifier recorded in the measurement instance table, where the first executing unit 809 is further configured to, when executing the measurement operation, increase, by 1, the number of times the measurement instance table is referenced; and a first storage unit 810, configured to store the flow table and the measurement instance table.

It should be noted that the measurement instance table may be stored in the first storage unit 810 in a form of an array, a form of a linked list, a form of a tree, may also be stored in a form of a figure, and may also be stored in another storage form. The present invention does not impose a restriction on this.

Figure 9:
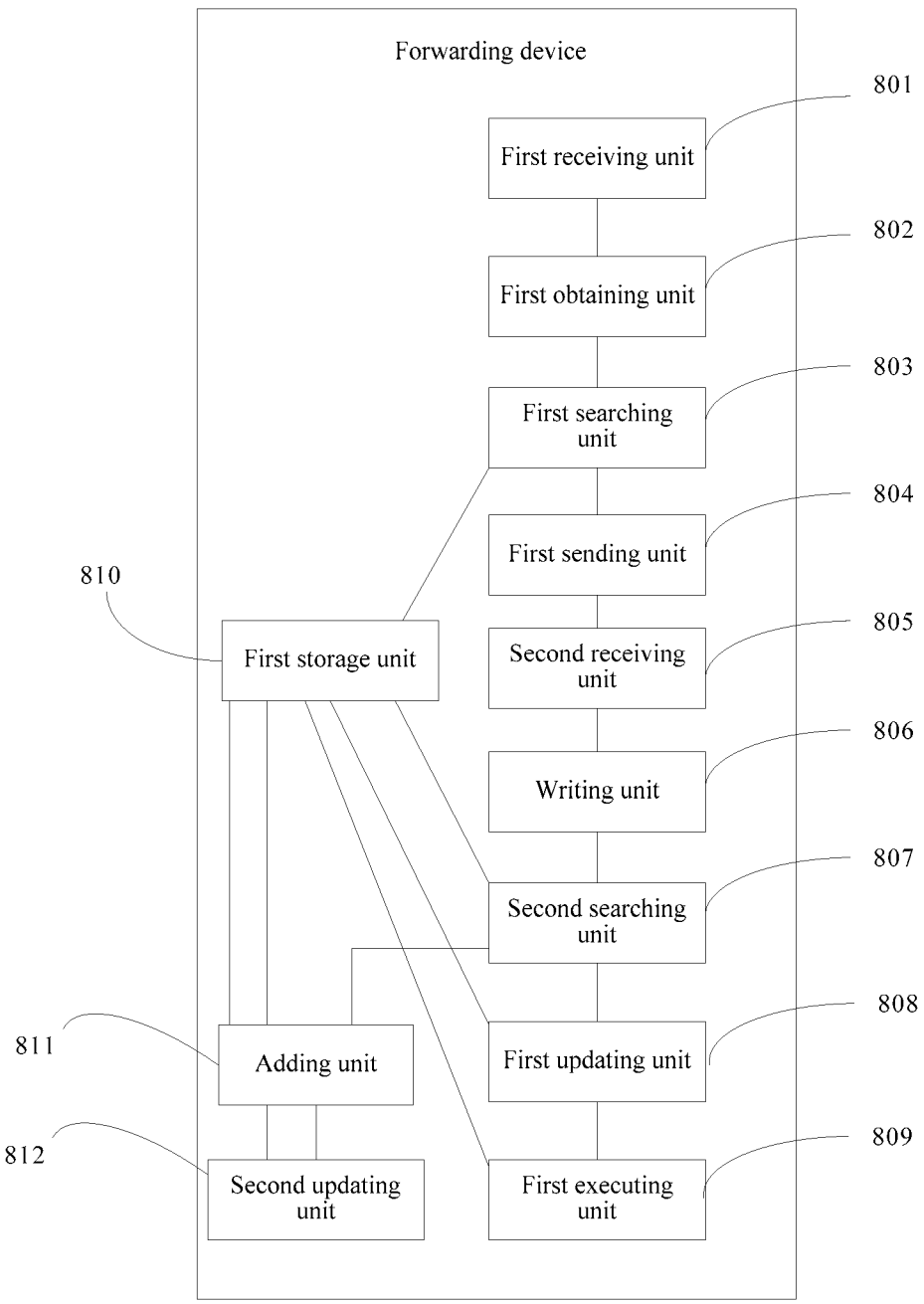
FIG. 9 is a schematic structural diagram of another forwarding device according to an embodiment of the present invention.

The forwarding device, as shown in FIG. 9, further includes:

an adding unit 811, configured to, if the first feature identifier is not recorded in the measurement instance table, add one entry of the measurement instance table, and add the feature identifier carried in the data flow to the entry in the measurement instance table in the first storage unit 810; and a second updating unit 812, configured to update, in the flow table and according to an index of the entry in the adding unit 811, the measurement operation for the feature identifier carried in the data flow to a measurement operation for the index.

Figure 10:
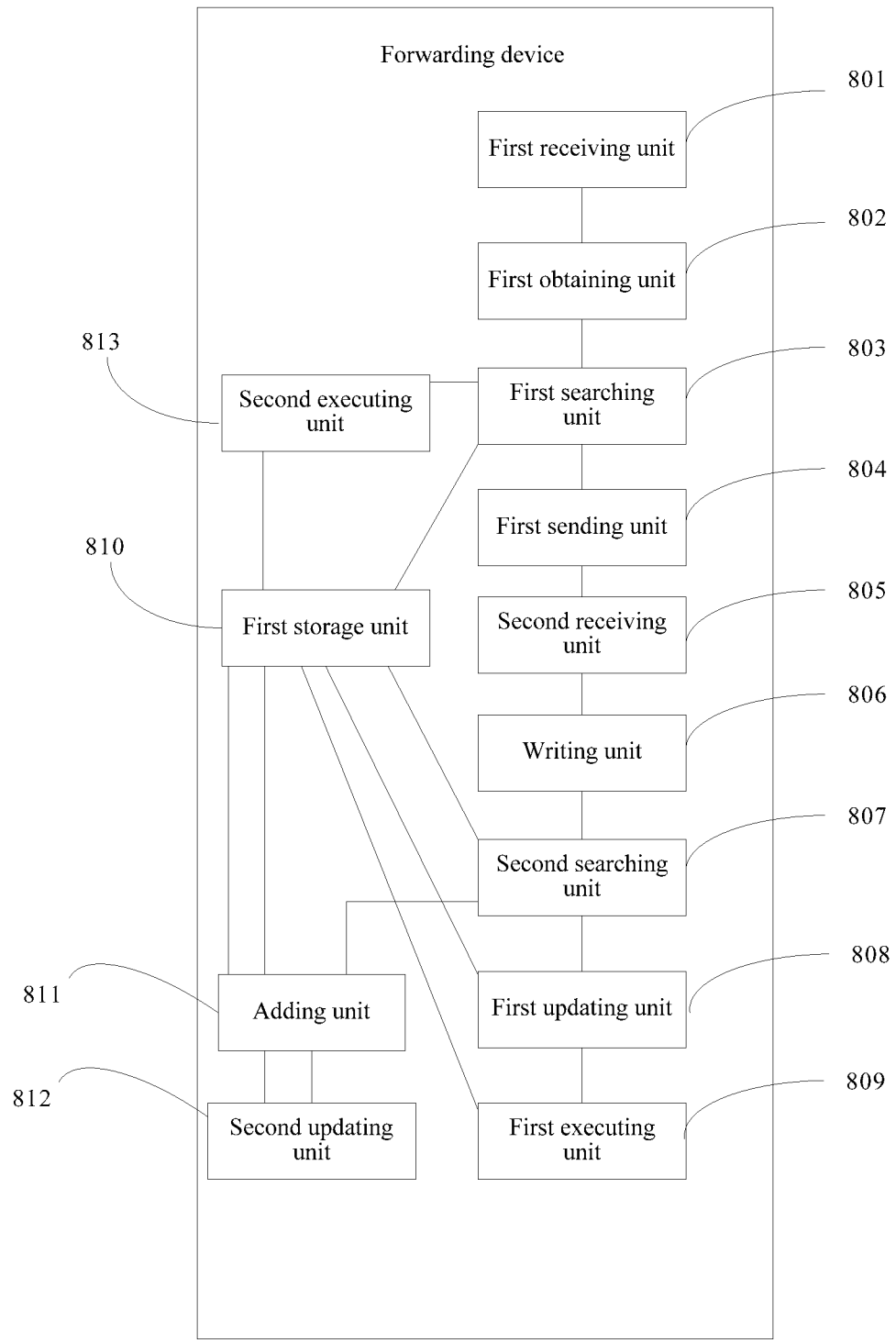
FIG. 10 is a schematic structural diagram of another forwarding device according to an embodiment of the present invention.

The forwarding device, as shown in FIG. 10, further includes:

a second executing unit 813, configured to, if information that is consistent with the matching information exists in the flow table, process the data flow according to various operations in the operation information in the flow table in the first storage unit 810.

When the measurement operation in the operation information is being executed, and according to the index in the measurement operation in the operation information in the flow table, the location of the entry in the measurement instance table is found and traffic corresponding to the first feature identifier in the measurement instance table is updated.

Figure 11:
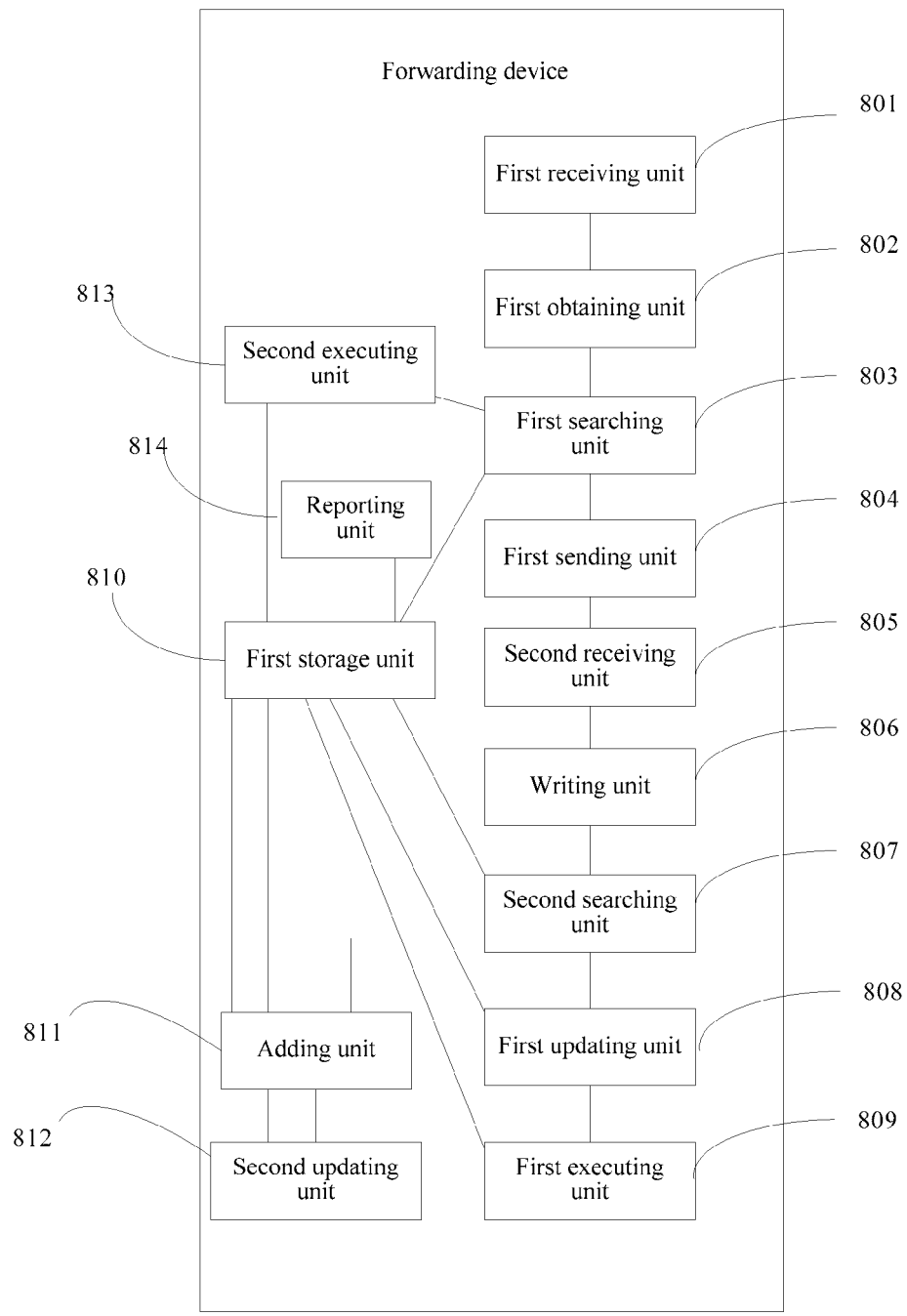
FIG. 11 is a schematic structural diagram of another forwarding device according to an embodiment of the present invention.

The forwarding device, as shown in FIG. 11, further includes:

a reporting unit 814, configured to periodically report measured data traffic to the controller.

It should be noted that the first executing unit and the second executing unit may be integrated into one unit and may also be independent units in the forwarding device. The present invention does not impose a restriction on this.

The embodiment of the present invention provides a forwarding device. The forwarding device receives a data flow, obtains the matching information of the data flow to search a flow table, and if no information that is consistent with the matching information exists in the flow table, sends the data flow to the controller. The forwarding device receives the information sent by the controller, updates the flow table according to the received information, searches a measurement instance table according to the feature identifier, and if a same item is found, update, when a measurement operation is being executed, traffic corresponding to the feature identifier recorded in the measurement instance table. In addition, the forwarding device further periodically reports measured data traffic to the controller. This implements traffic measurement on the data flow according to the feature identifier, improves a traffic measurement capability, and reduces management bandwidth of the controller over the forwarding device, thereby alleviating communications congestion.

Figure 12:
FIG. 12 is a schematic structural diagram of a system for traffic measurement according to an embodiment of the present invention.

An embodiment of the present invention provides a system for flow measurement, as shown in FIG. 12, including: a controller 131 and a forwarding device 132.

The controller 131 is configured to receive a data flow sent by the forwarding device 132, where the data flow includes a feature identifier, and know the type of the data flow by parsing the data flow; if the type of the data flow is a preset type in a measurement flow type set, obtain the feature identifier carried in the data flow and packet header information of the data flow, and obtain operation information corresponding to the data flow, and add a measurement operation for the feature identifier to the operation information, where the operation information is used to record various operations of the data flow; and send, to the forwarding device 132, the packet header information and the operation information added with the measurement operation for the feature identifier, so that the forwarding device 132 performs traffic measurement on the data flow according to the feature identifier.

The forwarding device 132 is configured to receive a data flow, where the data flow includes a feature identifier, and obtain matching information of the data flow; search a flow table by using the matching information, and if no information that is consistent with the matching information exists in the flow table, send the data flow to the controller 131; receive the packet header information and operation information of the data flow that are sent by the controller 131 and write the packet header information and operation information into the flow table, where the operation information contains at least the measurement operation for the feature identifier carried in the data flow; search a measurement instance table according to the feature identifier in the measurement operation, where the measurement instance table is used to record a feature identifier of a sent data flow and its corresponding traffic information; and if a first feature identifier is recorded in the measurement instance table and the first feature identifier is consistent with the feature identifier carried in the data flow, update, in the flow table and according to an index of an entry corresponding to the first feature identifier in the measurement instance table, the measurement operation for the feature identifier carried in the data flow to a measurement operation for the index, and when executing a measurement operation in the operation information in the flow table, update traffic information corresponding to the first feature identifier recorded in the measurement instance table.

An embodiment of the present invention provides a system for flow measurement. A forwarding device receives a data flow, obtains matching information of the data flow to search a flow table, and sends the data flow to a controller if no information that is consistent with the matching information exists in the flow table. The controller receives the data flow sent by the forwarding device, identifies that the data flow is a measurement data flow, obtains a feature identifier carried in the data flow and packet header information, and obtains operation information corresponding to the data flow, adds a measurement operation for the feature identifier to the operation information, and sends the obtained information to the forwarding device. The forwarding device receives the information sent by the controller, updates the flow table according to the received information, and searches a measurement instance table according to the feature identifier; if a same item is searched, according to an index of an entry corresponding to a first feature identifier in the measurement instance table, updates in the flow table the measurement operation for the feature identifier carried in the data flow to a measurement operation for the index; updates, when performing a measurement operation, traffic information corresponding to the feature identifier recorded in the measurement instance table. In addition, the forwarding device further periodically reports measured data traffic to the controller. This implements traffic measurement on the data flow according to the feature identifier, improves a traffic measurement capability, and reduces management bandwidth of the controller over the forwarding device, thereby alleviating communications congestion.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for flow measurement, comprising:

receiving, by a controller, a data flow sent by a forwarding device;

obtaining, by the controller, a type of the data flow by parsing the data flow;

when the type of the data flow is a type in a measurement flow type set, obtaining, by the controller, a feature identifier, packet header information of the data flow and operation information corresponding to the data flow;

adding, by the controller, a measurement operation for the feature identifier to the operation information, wherein the operation information is used to record various operations on the data flow;

sending, by the controller, to the forwarding device, the packet header information and the operation information added with the measurement operation for the feature identifier;

when the type of the data flow is not any type in the measurement flow type set, analyzing, by the controller, the type of the data flow and weight of the data flow in a service to determine whether the data flow needs to be measured;

when the data flow needs to be measured, adding, by the controller, the type of the data flow to the measurement flow type set to update the measurement flow type set.

2. A method for flow measurement, comprising:

receiving, by a forwarding device, a data flow;

obtaining, by the forwarding device, matching information of the received data flow;

searching, by the forwarding device, a flow table by using the matching information;

when no information that is consistent with the matching information exists in the flow table, sending, by the forwarding device, the received data flow to a controller;

receiving, by the forwarding device, packet header information of the received data flow and operation information on the received data flow that are sent by the controller;

writing, by the forwarding device, the packet header information and the operation information into the flow table, wherein the operation information contains at least a measurement operation for a feature identifier carried in the received data flow;

searching, by the forwarding device, a measurement instance table according to the feature identifier in the measurement operation, wherein the measurement instance table records a feature identifier of a data flow sent by the forwarding device and corresponding traffic information of the data flow sent by the forwarding device;

when a first feature identifier is recorded in the measurement instance table and the first feature identifier is consistent with the feature identifier carried in the received data flow, updating, by the forwarding device, in the flow table and according to an index of a first entry corresponding to the first feature identifier in the measurement instance table, the measurement operation for the feature identifier carried in the received data flow to a measurement operation for the index of the first entry; and executing, by the forwarding device, various operations in the operation information in the flow table, and when executing the measurement operation in the operation information in the flow table, updating, by the forwarding device, traffic information corresponding to the first feature identifier recorded in the measurement instance table.

3. The method according to claim 2, further comprising:

when the first feature identifier is not recorded in the measurement instance table, creating, by the forwarding device, a second entry to the measurement instance table;

adding, by the forwarding device, the feature identifier carried in the received data flow to the second entry; and updating, by the forwarding device, the measurement operation for the feature identifier carried in the received data flow to the measurement operation for an index according to an index of the second entry in the flow table.

4. The method according to claim 3, further comprising:

increasing, by the forwarding device, by a number 1, a quantity of times the measurement instance table is referenced.

5. The method according to claim 2, further comprising:

when information that is consistent with the matching information exists in the flow table, processing, by the forwarding device, the received data flow according to each operation in the operation information in the flow table, wherein when the measurement operation in the operation information is being executed, the forwarding device finds location of a third entry that is in the measurement instance table according to an index of the measurement operation in the operation information in the flow table, wherein the third entry corresponds to the index of the measurement operation, and the forwarding device updates traffic information corresponding to the first feature identifier in the measurement instance table.

6. The method according to claim 5, further comprising:

periodically reporting, by the forwarding device, measured data traffic to the controller.

7. A controller, wherein the controller comprises a processor coupled with a memory, the processor is configured to:

receive a data flow sent by a forwarding device;

obtain a type of the data flow by parsing the data flow;

when the type of the data flow is a type in a measurement flow type set, obtain a feature identifier, packet header information of the data flow, and operation information corresponding to the data flow;

add a measurement operation for the feature identifier to the operation information, wherein the operation information is used to record various operations on the data flow; and send, to the forwarding device, the packet header information and the operation information added with the measurement operation for the feature identifier, wherein the packet header information and the operation information are obtained by the processor;

when the type of the data flow is not any type in the measurement flow type set, analyze the type of the data flow and weight of the data flow in a service to determine whether the data flow needs to be measured; and if the data flow needs to be measured, add the type of the data flow to the measurement flow type set to update the measurement flow type set; and obtain the weight of the data flow in the service.

8. A forwarding device, wherein the forwarding device comprises a processor coupled with a memory, the processor is configured to:

receive a data flow;

obtain matching information of the received data flow;

search a flow table by using the matching information;

send the received data flow to a controller if no information that is consistent with the matching information exists in the flow table;

receive packet header information of the received data flow and operation information on the received data flow that are sent by the controller;

write, into the flow table, the packet header information and the operation information, wherein the operation information contains at least a measurement operation for a feature identifier carried in the received data flow;

search a measurement instance table according to the feature identifier in the measurement operation, wherein the measurement instance table is used to record a feature identifier of a data flow sent by the forwarding device and corresponding traffic information of the data flow sent by the forwarding device;

when a first feature identifier is recorded in the measurement instance table and the first feature identifier is consistent with the feature identifier carried in the received data flow, update, in the flow table and according to an index of a first entry corresponding to the first feature identifier in the measurement instance table, the measurement operation for the feature identifier carried in the received data flow to the measurement operation for the index of the first entry;

execute each operation in the operation information of the flow table, and when executing the measurement operation, update traffic information corresponding to the first feature identifier recorded in the measurement instance table.

9. The forwarding device according to claim 8, wherein the processor is further configured to, when executing the measurement operation, increase, by a number 1, a quantity of times the measurement instance table is referenced.

10. The forwarding device according to claim 9, the processor is further configured to:

when the first feature identifier is not recorded in the measurement instance table, create a second entry to the measurement instance table;

add the feature identifier carried in the received data flow to the second entry in the measurement instance table; and update the measurement operation for the feature identifier carried in the received data flow to the measurement operation for an index according to an index of the second entry in the flow table.

11. The forwarding device according to claim 9, the processor is further configured to:

when information that is consistent with the matching information exists in the flow table, process the received data flow according to each operation in the operation information in the flow table, wherein when the measurement operation in the operation information is being executed, find location of a third entry that is in the measurement instance table according to an index in the measurement operation in the operation information in the flow table, wherein the third entry corresponds to the index in the measurement operation, and update traffic information corresponding to the first feature identifier in the measurement instance table.

12. The forwarding device according to claim 8, the processor is further configured to:

when information that is consistent with the matching information exists in the flow table, process the received data flow according to each operation in the operation information in the flow table, wherein when the measurement operation in the operation information is being executed, find location of a third entry that is in the measurement instance table according to an index in the measurement operation in the operation information in the flow table, wherein the third entry corresponds to the index in the measurement operation, and update traffic information corresponding to the first feature identifier in the measurement instance table.

13. The forwarding device according to claim 12, the processor is further configured to:

periodically report measured data traffic to the controller.

* * * * *